(12) United States Patent
Petit et al.

(10) Patent No.: US 11,453,280 B2
(45) Date of Patent: Sep. 27, 2022

(54) INSERT FOR A RUN SLIDE FOR A VEHICLE WINDOW

(71) Applicant: HUTCHINSON, Paris (FR)

(72) Inventors: Emmanuel Petit, Montargis (FR); Benoît Prochasson, Chailly-en-Gâtinais (FR); Pierre David, Montargis (FR)

(73) Assignee: HUTCHINSON, Paris (FR)

( * ) Notice: Subject to any disclaimer, the term of this patent is extended or adjusted under 35 U.S.C. 154(b) by 286 days.

(21) Appl. No.: 16/643,276

(22) PCT Filed: Sep. 3, 2018

(86) PCT No.: PCT/EP2018/073630
§ 371 (c)(1),
(2) Date: Feb. 28, 2020

(87) PCT Pub. No.: WO2019/043228
PCT Pub. Date: Mar. 7, 2019

(65) Prior Publication Data
US 2020/0189371 A1    Jun. 18, 2020

(30) Foreign Application Priority Data
Sep. 4, 2017    (FR) ..................... 1758130

(51) Int. Cl.
*B60J 10/30*    (2016.01)
*B60J 5/04*    (2006.01)

(52) U.S. Cl.
CPC ............. *B60J 10/30* (2016.02); *B60J 5/0402* (2013.01)

(58) Field of Classification Search
CPC .............................. B60J 5/0402; B60J 10/30

(Continued)

(56) References Cited

U.S. PATENT DOCUMENTS 6,723,414 B2 *  4/2004  Aritake ............... B32B 3/26
                                                    49/490.1
6,725,605 B2 *  4/2004  Schlachter .......... B60J 10/21
                                                    49/479.1

(Continued)

FOREIGN PATENT DOCUMENTS

FR       2951407 A1    4/2011
WO   2016/174315 A1   11/2016

OTHER PUBLICATIONS

Written Opinion of the International Searching Authority dated Oct. 19, 2018, issued in corresponding International Application No. PCT/EP2018/073630, filed Sep. 3, 2018, 4 pages.

(Continued)

*Primary Examiner* — Jason S Morrow
(74) *Attorney, Agent, or Firm* — Christensen O'Connor Johnson Kindness PLLC

(57) ABSTRACT

An insert for a run slide for a vehicle window. The insert may be overmoulded to form a connecting wedge between two strands of the run slide. The insert may be formed in one piece and is configured to cooperate with a portion of a vehicle door frame. The insert is further configured to cooperate with a portion of a hubcap to be attached to one of the strands. The insert includes a protruding pin configured to be engaged in a recess of a rabbet of the vehicle door frame to index the insert along an axis X substantially parallel to an axis of elongation of the rabbet. The insert is configured to cooperate with the portion of the hubcap to ensure indexing the hubcap along the axis X and along an axis Z perpendicular to X and substantially parallel to an axis of elongation of the hubcap.

17 Claims, 3 Drawing Sheets

(58) Field of Classification Search
USPC .......................................... 296/146.2, 146.9
See application file for complete search history.

(56) References Cited

U.S. PATENT DOCUMENTS

| | | | | |
|---|---|---|---|---|
| 8,458,959 | B2* | 6/2013 | Ohtake | B60J 10/86 |
| | | | | 49/502 |
| 9,849,757 | B2* | 12/2017 | Stachewicz | B60J 1/10 |
| 10,160,296 | B2* | 12/2018 | Makita | B60J 5/0402 |
| 2007/0068085 | A1* | 3/2007 | Ninomiya | B60J 10/16 |
| | | | | 49/489.1 |
| 2009/0108625 | A1* | 4/2009 | Minami | B60J 10/265 |
| | | | | 49/490.1 |
| 2018/0141421 | A1 | 5/2018 | Blottiau | |
| 2021/0170835 | A1* | 6/2021 | Fukui | E05F 11/483 |
| 2021/0206239 | A1* | 7/2021 | Ishiguro | B60J 1/17 |

OTHER PUBLICATIONS

International Preliminary Report on Patentability dated Mar. 10, 2020, issued in corresponding International Application No. PCT/EP2018/073630, filed Sep. 3, 2018, 1 page.

International Search Report dated Oct. 19, 2018, issued in corresponding International Application No. PCT/EP2018/073630, filed Sep. 3, 2018, 2 pages.

Written Opinion of the International Searching Authority dated Oct. 19, 2018, issued in corresponding International Application No. PCT/EP2018/073630, filed Sep. 3, 2018, 5 pages.

\* cited by examiner

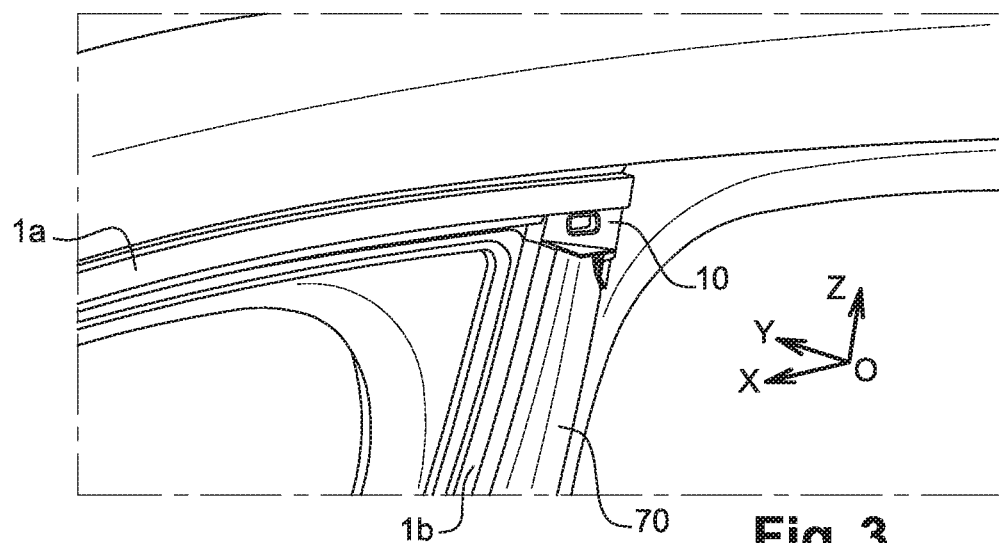
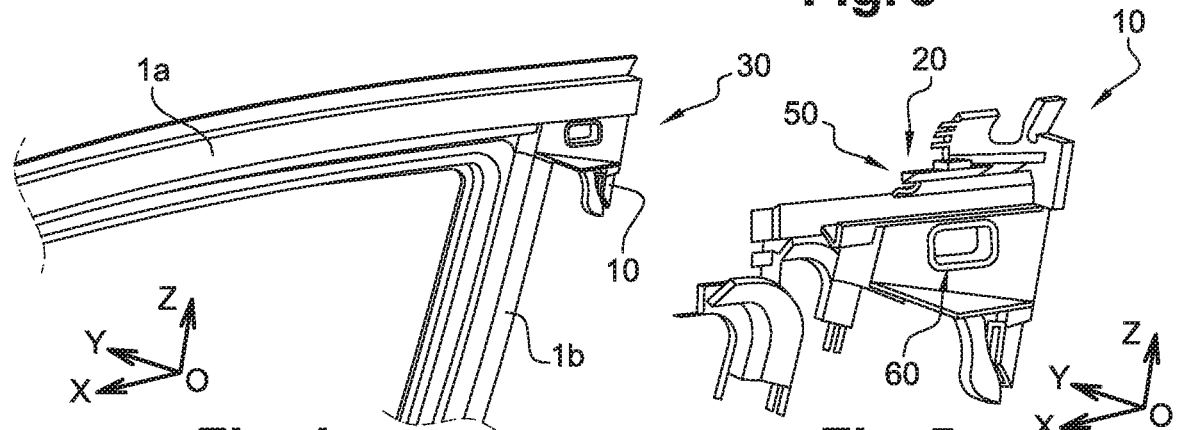
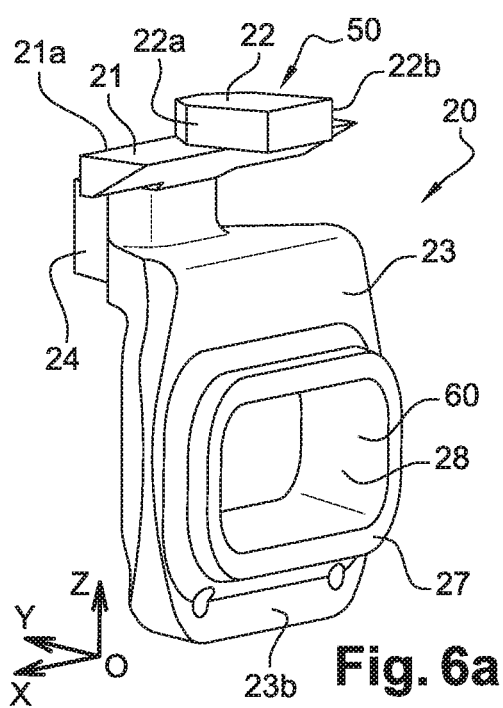
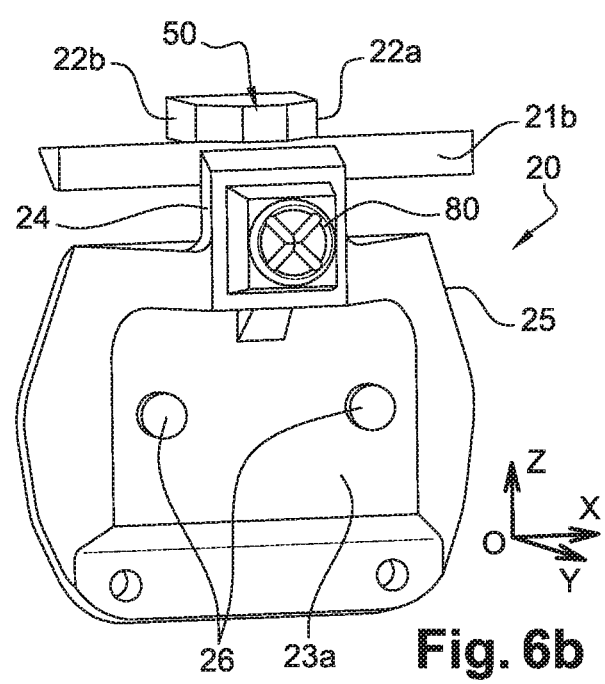

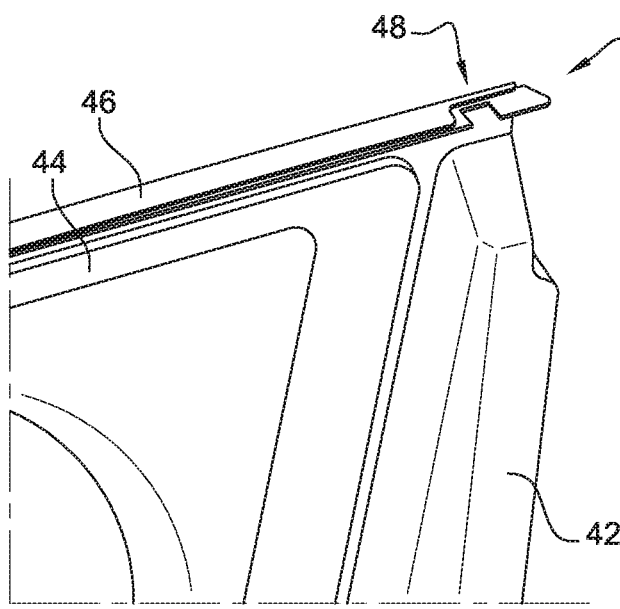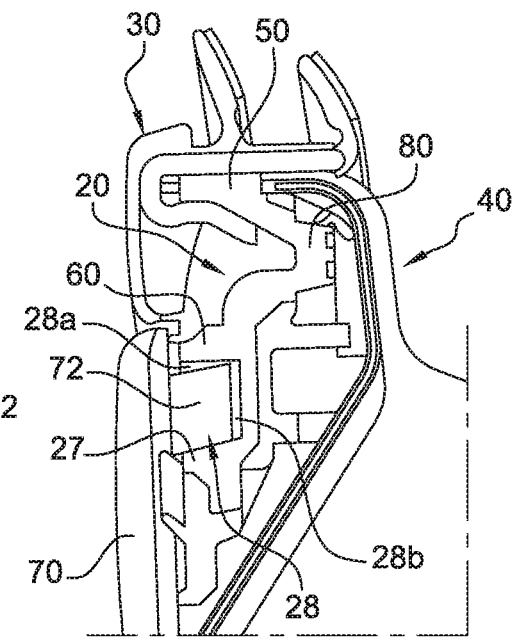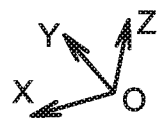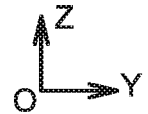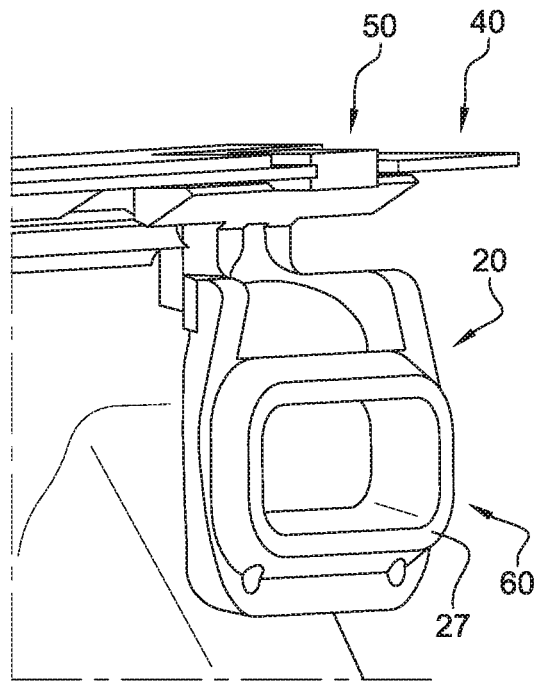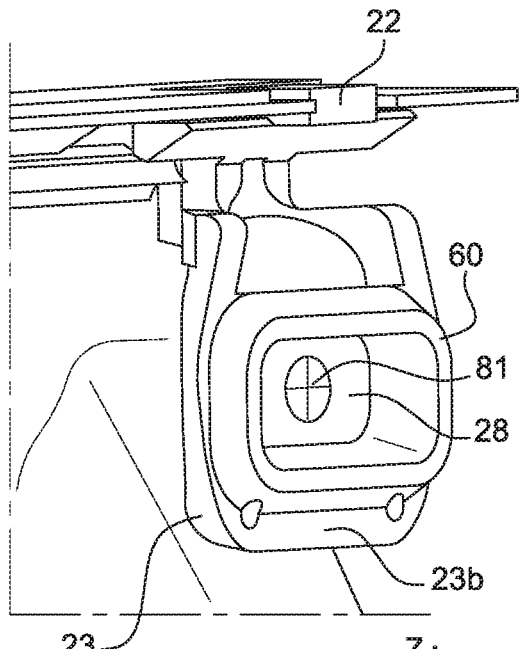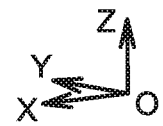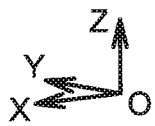

INSERT FOR A RUN SLIDE FOR A VEHICLE WINDOW

TECHNICAL FIELD

The present invention relates in particular to an insert for a run slide of a vehicle window, in particular a motor vehicle, as well as a run slide comprising such an insert.

BACKGROUND

In a motor vehicle, a door frame is equipped with a run slide or a run slide seal for receiving a sliding window. The run slide usually consists of two vertical or ascending strands connected to each other by a horizontal or upper strand. The run slide then has a general inverted U-shape. However, this shape can be more complex, especially if the run slide is connected to sealing segments of a fixed window.

Generally speaking, there are three main families of run slides: U-shaped run slides, single-rabbet run slides and concealed frame run slides. The latter have a U-shaped cross-section fixing clamp which is fitted to the door frame and comprises a metal reinforcement to reinforce the clamp's hold, two asymmetrical legs equipped with sealing lips, and one or two additional lips providing a double sealing function.

The strands of a run slide are made of a suitable material such as a thermoplastic or elastomer (e.g. EPDM) and are then joined together by wedge overmoulding. A first front wedge connects the front end of the horizontal strand to the front vertical strand, and a second rear wedge connects the rear end of the horizontal strand to the rear vertical strand. The material of the wedges can also be a thermoplastic or an elastomer (e.g. EPDM). In practice, the above-mentioned ends of the strands are arranged in the cavity of a mould into which this material is injected and, after cooling and/or cross-linking, ensures the connection of the strands.

It is known to integrate an insert in the moulded wedge of a run slide, in particular the wedge corresponding to the middle foot of the door, i.e. the rear wedge for a front door window and the front wedge for a rear door window. This insert is generally made of plastic and is arranged in the aforementioned cavity of the mould so as to be integrated into the wedge when it is overmoulded.

The assembly of a concealed frame run slide on a door frame is generally carried out by clipping the horizontal strand onto the opposite frame rabbet in a Y direction, i.e. a lateral direction in relation to the direction of travel of the vehicle (in an orthonormal mark XYZ, the axis X corresponds to the direction of travel of the vehicle, forwards or backwards, and is therefore substantially horizontal, the axis Y corresponds to a transverse direction, and the axis Z to a direction perpendicular to the axes X and Y and therefore substantially vertical).

Once clipped, the run slide is very difficult to slide along the axis X, which is substantially parallel to the longitudinal axis of the rabbet. The insert of the run slide wedge generally comprises a recess which is free of overmoulded material and which is intended to receive an indexing stud present on the door, generally on the middle foot, slightly below the rabbet. This ensures correct indexing along the axis X of the run slide, and avoids disassembly for repositioning the part.

The disadvantage of this solution is the size of the indexing stud, which is quite fragile and is located behind the run slide. The installation of the run slide is therefore complex because it is done almost blindly.

On the other hand, once all the strands have been correctly positioned on the door frame, trims, covers or "appliqués" are generally attached and mounted on the run slide, for example at the middle foot or rear foot. It is necessary to ensure correct relative positioning along the axes X and Z of these elements, and a protrusion is sometimes provided for this purpose in the moulded wedge.

Finally, for ease of dimensional inspection of the run slide at the end of the production line, at least one test pattern is usually integrated into the moulded wedge, which allows laser inspection for example. However, the presence of a test pattern on the wedge and therefore the moulded material requires special machining of the mould to form a production impression of the test pattern, and therefore represents an additional cost. In addition, this impression can wear out during the use of the mould and may require a regular re-machining operation of the mould in order to re-form the impression in the mould.

The invention offers a simple, effective and economical solution to at least some of these problems.

SUMMARY OF THE INVENTION

For this purpose, the invention provides an insert for a run slide for a vehicle window, this insert being intended to be overmoulded to form a connecting wedge between two strands of the run slide, the insert being formed in a one piece and comprising first indexing means configured to cooperate with a portion of a door frame of the vehicle and second indexing means configured to cooperate with a portion of a cover intended to be attached to one of the said strands, characterized in that said first means comprise at least one protruding pin configured to be engaged in a notch of a rabbet of the door frame of the vehicle in order to ensure indexing of said insert along an axis X substantially parallel to an axis of elongation of the rabbet, and in that said second means are configured to cooperate by complementary shapes with said portion of the cover in order to ensure indexing of said cover along said axis X as well as along an axis Z perpendicular to X and substantially parallel to an axis of elongation of said cover.

The insert is thus configured to ensure precise positioning along the axis X of the run slide on the door frame, as well as precise positioning of the cover along the axes X and Z with respect to the run slide. This involves the presence of a notch on the rabbet of the door frame, which replaces the pin of the prior art. This notch is relatively simple to make. Moreover, it is visible and accessible to an operator, which makes it easier to position and assemble the run slide on the door frame.

The insert according to the invention may comprise one or more of the following characteristics, taken alone or in combination with each other:

the insert comprises a shelf configured to extend parallel to the rabbet and on which said protruding pin is located; this shelf can rest on the rabbet and facilitate the positioning of the run slide, the insert comprises a plate configured to extend perpendicularly to a plane of the rabbet and on one face of which said second means are located, the plate comprises an outer face on which said second means are located, and an inner face on which positioning and/or anchoring studs are located; these studs are generally configured to ensure a correct position of the insert in the mould during injection, and can facilitate the attachment of the overmoulded material to the insert, the shelf and the plate are connected by a thinned connection, the insert comprises at least one test pattern; the test pattern in the wedge of the run slide was located on the overmoulded material in the prior art and is here located on the insert; this avoids the above-mentioned problem of the prior art, the insert comprises a first test pattern which is located on an inner face of said thinned part; advantageously, this test pattern is left free of overmoulded material during the manufacture of the run slide wedge, the insert comprises a second test pattern which is located on an outer face of said plate; advantageously, this second test pattern is left free of overmoulded material during the manufacture of the run slide wedge; it is for example located at the level of said second means, said second means comprise a recess configured to receive said portion of the cover, said second test pattern is located in said recess, said or each test pattern may be in the form of a line, two intersecting lines, a circle, etc., or a combination of these shapes, said recess has a generally trapezoidal cross-sectional shape, a large base of which is located at an opening of said recess and a small base of which is located at a bottom of said recess; the trapezoidal shape facilitates the positioning of the cover, said second means comprise a peripheral O-shaped edge formed as a protrusion on said outer face and internally defining said recess, this peripheral shape facilitates the positioning of the cover by both sliding and pressing, and this along both the axes X and Z.

The invention also relates to a run slide for a car window, comprising at least two strands, such as a horizontal strand and a vertical strand, connected together by an overmoulded wedge in which an insert as described above is integrated.

The run slide according to the invention may comprise one or more of the following characteristics, taken separately from one another or in combination with one another:

said first and second means are free of overmolded material, said pin and said shelf are free of overmolded material, the or each test pattern is free of overmolded material.

The invention further provides an insert for a run slide of a car window, this insert being intended to be overmoulded to form a connecting wedge between two strands of the run slide, the insert being formed in a one piece and comprising first indexing means configured to cooperate with a portion of a door frame of the vehicle and second indexing means configured to cooperate with a portion of a cover intended to be attached to one of said strands, characterised in that it further comprises at least one test pattern which is configured so as to remain free of overmoulded material after said wedge has been made.

This insert may comprise one or more of the characteristics of the insert described above.

DESCRIPTION OF FIGURES

The invention will be better understood and further details, characteristics and advantages of the invention will appear when reading the following description made by way of a non-limitative example and with reference to the appended drawings, in which:

FIG. 3 is a partial schematic perspective view of a run slide according to the invention arranged on a door frame of a motor vehicle, FIG. 4 is a partial schematic perspective view of the run slide of FIG. 3, FIG. 5 is a partial schematic perspective view of the overmolded wedge of the run slide of FIG. 3, FIGS. 6a and 6b are schematic perspective views of the insert of the run slide in FIG. 3, FIG. 7 is a partial schematic perspective view of the door frame of FIG. 3, FIGS. 8 and 9 are schematic views, in perspective and cross-section, respectively, of the run slide insert of FIG. 3, and illustrate its positioning in relation to a rabbet of the door frame and an attached cover, and FIG. 10 is a view corresponding to that of FIG. 8 and illustrates a variant of embodiment of the insert according to the invention.

DETAILED DESCRIPTION

Figure 1:
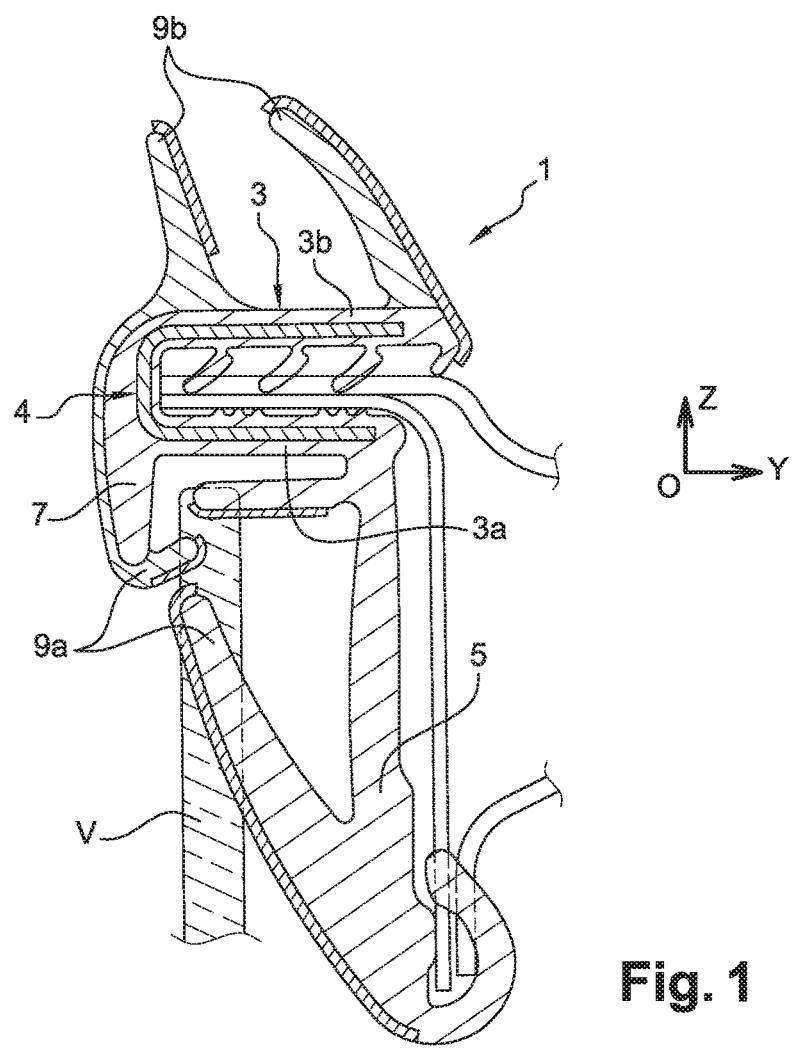
FIG. 1 is a sectional view of a seal forming the upper strand of a concealed frame type run slide according to the prior art referred to in the preamble.

The window joint 1 of the run slide type shown in FIG. 1 illustrates the prior art mentioned in the preamble. This joint 1, which forms an upper run slide strand, comprises a fixing clamp 3 with a U-shaped cross-section in which a metal reinforcement 4, also with a U-shaped cross-section, is embedded. However, this reinforcement is optional, so that the invention concerns a joint or a run slide, whether reinforced or not, i.e. whether or not it is provided with a reinforcement.

The seal 1 further comprises two asymmetrical legs 5 and 7, respectively main and secondary, which extend, substantially at 90°, a branch 3a of the fixing clamp 3 and which end in sealing lips 9a capable of coming into sliding contact with the two faces of a V window. The other branch 3b of the fixing clamp 3 supports sealing lips 9b suitable for coming into contact with the body of the vehicle.

Figures 2A, 2B, 2C:
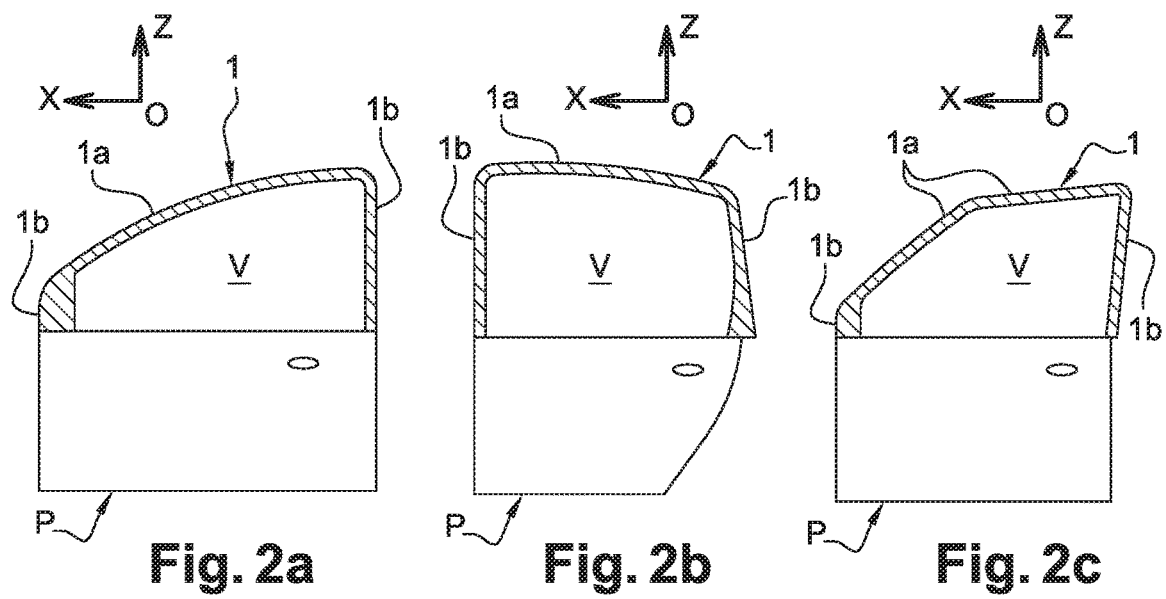
FIGS. 2a, 2b and 2c are schematic frontal views to illustrate a front door and a rear door of a sedan type vehicle and a front door of a minivan type vehicle, respectively.

In FIGS. 2a, 2b and 2c different P-doors of a motor vehicle are shown schematically, highlighting the general shapes of the window seals forming run slides.

In the case of FIG. 2a of a sedan type front door P, the upper strand 1a of the run slide or seal 1 has a large curvature, whereas it has a small curvature in the case of FIG. 2b of a sedan type rear P-door or two parts with a small curvature in the case of FIG. 2c of a minivan type front P-door.

The vertical lateral strands 1b of each run slide or joint 1 are joined to the upper strand 1a by moulded joining wedges 10, known per se, and the two parts of the upper strand 1a in FIG. 2c.

A wedge 10 is produced by injecting an elastomeric material into the cavity of a mould in which the ends of the strands to be joined are located. The mould cavity also receives a plastic insert which is used to facilitate the positioning and mounting of the run slide on the door frame.

FIGS. 3 to 9 illustrate an embodiment of the invention, which relates in particular to the insert 20 as such and to the run slide 30 incorporating this insert 20.

The insert 20 alone is visible in FIGS. 6a and 6b. The run slide 30 alone is shown in FIG. 4, FIG. 5 showing the moulded wedge 10 and the insert 20 of this run slide. Finally, FIGS. 3, 7, 8 and 9 show the cooperation of the insert 20 and run slide 30 with the door frame 40 of the vehicle.

In the following description and throughout the application, the indices X, Y and Z refer to the axes of an orthonormal marker XYZ. The axis X corresponds to the direction of movement of the vehicle, forward or rearward, and is therefore substantially horizontal, the axis Y corresponds to a transverse direction, and the axis Z corresponds to a direction perpendicular to the axes X and Y and therefore substantially vertical.

The door frame 40 (FIGS. 7-9) conventionally comprises a vertical post 42 forming a middle leg whose upper end is connected to an upper profile 44, the post 42 and the profile 44 at least partly defining the frame for a sliding window of the door of the vehicle.

The door frame 40 comprises a rabbet 46 which extends along its upper profile 44, and more precisely along an upper edge of this profile 44, this rabbet 46 being formed by a folded edge of the frame. The frame 40 is usually formed by stacking and assembling at least two sheets together, so that the rabbet 46 and the folded edge can be obtained by folding the upper edges of two sheets, as can be seen in FIG. 7.

The rabbet 46 extends substantially along the axis X, at least in the area in the vicinity of the middle foot, i.e. of the post 42. The rabbet 46 comprise a notch 48. It is situated in the vicinity of the middle foot, and here substantially perpendicular to the post 42.

The notch 48 extends substantially along the axis Z, i.e. perpendicularly to the axis of elongation of the rabbet 46. The notch 48 has for example a globally U-shaped form with the opening at the free edge of the rabbet 46. The notch 48 here comprises a first U-shaped cut-out in one of the sheets, i.e. the lower sheet, and a second L-shaped cut-out in the other sheet, i.e. the upper sheet (FIG. 7). The cut-outs are roughly superimposed along the axis Z.

FIG. 7 shows that the edges of the L-shaped cut-out are located at a distance from the edges of the U-shaped cut-out. In the example shown, the edges of the U-shaped cut-out form support and positioning edges of the run slide 30.

The wedge 10 of the run slide may have a complex shape as shown in the example in FIG. 5. It comprises portions connected to strands 1a, 1b to secure them together while ensuring continuity in their profiles and external aspects.

FIG. 4 shows that some portions of the wedge 10 are hidden by strands 1a, 1b after fabrication of the run slide 30. Similarly, FIG. 5 shows that certain portions of the insert 20 are hidden by the overmolded material and the run slide 30 after fabrication.

In the example shown, the only portions of the insert 20 not covered by overmolded material (and therefore "free" of such material) are first means 50 for indexing the run slide with respect to the door frame 40 along the axis X, and second means 60 for indexing a cover 70 on the run slide 30 along the axes X and Z (FIGS. 8 and 9). In addition, in the example shown, the insert 20 comprises a test pattern 80 which is free of overmoulded material, as will be described in more detail in the following, in order to allow laser inspection of the run slide after its manufacture.

An embodiment of the insert 20 is shown in FIGS. 6a and 6b. In the example shown, it consists essentially of an upper shelf 21 carrying a protruding pin 22 and forming the first indexing means 50, and a lower plate 23 carrying the second indexing means 60.

The shelf 21 is flat and has a generally elongated shape along the axis X in use. It comprises a flat upper face 21a on which the protruding pin 22 is located. It is further connected to the plate 23 by an inner face 21b (facing the interior of the vehicle) or lower face, via a thinned connection 24. In the example shown, it has in cross-section (in a YOZ plane) a general triangular shape.

The shelf 21 is shaped to extend along and under the rabbet 46 and is able to rest against it, thus against its lower surface, as can be seen in FIG. 8.

The pin 22 is shaped to fit into the notch 48 of the rabbet 46. It is therefore dimensioned to fit into this notch 48 and in particular into the U-shaped cut-out of the lower sheet. In particular, it has a height (or dimension along the axis Z) greater than the thickness of the rabbet along the same axis, and a width (or dimension along the axis X) slightly less than the width of the notch 48 along the same axis. The opposite lateral edges 22a, 22b of the pin 22, located respectively towards the front and rear of the vehicle in use, are configured to slidably and abuttingly cooperate with the lateral edges facing the notch 48 of the rabbet 46. The sliding occurs along the axis Y and abutments occur along the axis X. In addition, the shelf 21 cooperates by support along the axis Z with the rabbet 46. As can be seen in FIG. 5, the shelf 21 and the pin 22 are free of overmoulded material, although FIGS. 4 and 9 show that they are located behind the upper strand 1b of the run slide 30.

The thinned connection 24 comprises an inward projection 25 at the top of which is located the test pattern 80. The projection 25 is intended to be covered with overmoulded material, whereas its top and therefore the test pattern 80 are not. The test pattern 80 is here realized by a relief pattern representing a circle inside which two X-shaped intersecting bars are arranged. It could have another shape. In the example shown, the thinned connection 24 has a general shape which facilitates the anchoring of the insert 20 in the overmoulded material. In addition, it allows a certain flexibility of the insert and thus of the wedge 10 in bending in an XOZ plane.

The shelf 21 is connected by the thinned connection 24 to the upper end of the plate 23, which is substantially flat and extends in the XOZ plane. The plate 23 comprises two faces, inner 23a and outer 23b respectively. The inner face 23a comprises positioning and/or anchoring studs 26 and the second indexing means 60 are located on the outer face 23b.

These means 60 here comprise a O-shaped peripheral edge 27 or with a globally oblong shape which is formed protruding from the face 23b and which internally defines a recess 28 for receiving a finger 72 of the cover 70 (FIG. 9). The oblong shape or O-shape is preferred so that the wedges of the edge are rounded.

As can be seen in FIG. 9, the recess 28 has in section in a ZOY plane a general trapezoidal shape with the large base 28a located at the opening of the recess 28 and the small base 28b located at the bottom of the recess. This shape gives the recess a conical, i.e. tapering, profile along the axis Y from the outside to the inside of the vehicle. The finger 72 has a shape complementary to that of this recess 28, which makes it easier to guide the finger 72 and to position the cover 70 during the assembly.

The plate 23 is intended to be covered with overmoulded material. Along the axis Y, the overmoulded material extends to the top or free edge of the edge 27, as shown in FIG. 5, with the recess 28 being free of this material.

The run slide 30 in FIG. 4 is mounted on a vehicle door frame 40 as follows. The run slide 30 is presented on the frame 40 in such a way that its strands 1a, 1b are substantially aligned with the profile 44 and the post 42 of the frame. The shelf 21 and the pin 22 of the insert 20 are then used to position the run slide correctly on the door frame, the pin having to be engaged in the notch 48 of the rabbet 46 by moving along the axis Y until it comes to rest substantially at the bottom of the notch. During this movement, the upper strand 1b of the run slide is clipped onto the rabbet 46 along its entire length. The cover 70 or a similar element can then be fitted to the run slide by inserting the finger 72 into the recess 28, the cover being intended to extend along the middle foot of the door frame 40.

FIG. 10 shows a variant of embodiment of the insert which differs from the one described above in that it comprises a test pattern 81 arranged in a different area. The insert in FIG. 10 may include the test pattern 80 described above and the test pattern 81, or the test pattern 81 may replace the test pattern 80.

The test pattern 81 is located on the outer face 23b of the plate 23 and more precisely at the second means 60, at the bottom of the recess 28. It is therefore understandable that this test pattern 81 will be visible after the insert has been overmoulded, since the recess must remain free of overmoulded material in order to accommodate the cover finger.

The test pattern 81 is located approximately in the middle of the recess 28. It is preferably located at perpendicularly to the pin 22. As mentioned above, the upper strand extends in front of the pin 22 and the mask. The operator can use the test pattern 81 to have a precise idea of the position of the pin 22, to position the run slide during its assembly and to facilitate the insertion of the pin in the notch of the rabbet of the door frame. The test pattern 81 can also be used to check the run slide after manufacture, as is the case with the test pattern 80.

The particular examples of embodiment of the insert 20 in FIGS. 3 and following allow to solve the difficulties of positioning and integrate three functions: the indexing according to the axis X of the run slide, the indexing of the cover, and the test pattern(s).

It has many advantages:

for better visibility during assembly, the indexing of the upper strand of the run slide is done directly on the rabbet of the frame, through the notch in which the non-overmoulded pin of the insert is housed;

for simpler indexing of the cover 70, the insert is provided not with a horizontal notch but with a substantially oblong recess slightly below, directed towards the outside of the vehicle. Its rounded, slightly conical shape allows the cover to be positioned in a guided, with a self-centering manner while maintaining a tolerant positioning clearance. This reception area of the cover is also not covered by the overmoulded material; and for a dimensional inspection of the finished part, the test pattern is not overmoulded to remain visible.

The material of the insert 20 is preferably polyamide 6.6 (PA) loaded with 30% glass fibre, with an adhesive coating to allow good adhesion of the overmoulding compound. Other materials may be used, such as POM, differently loaded PA, etc.

The invention claimed is:

1. An insert for a run slide for a vehicle window, the insert being adapted to be overmoulded to form a connecting wedge between two strands of the run slide, the insert being formed in one piece and comprising first indexing means configured to cooperate with a portion of a door frame of the vehicle and second indexing means configured to cooperate with a portion of a cover adapted to be attached to one of the said strands, wherein said first indexing means comprise at least one protruding pin configured to be engaged in a notch of a rabbet of the door frame of the vehicle in order to ensure indexing of said insert along an axis X substantially parallel to an axis of elongation of the rabbet, and wherein said second indexing means are configured to cooperate by complementary shapes with said portion of the cover in order to ensure indexing of said cover along said axis X and along an axis Z perpendicular to X and substantially parallel to an axis of elongation of said cover.

2. The insert according to claim 1, further comprising a shelf configured to extend parallel to the rabbet and on which said protruding pin is located.

3. The insert according to claim 2, further comprising a plate configured to extend perpendicularly to a plane of the rabbet and on one face of which said second indexing means are located.

4. The insert according to claim 3, wherein the plate comprises an outer face on which said second indexing means are located, and an inner face on which positioning and/or anchoring studs are located.

5. The insert according to claim 3, wherein the shelf and the plate are connected by a thinned connection.

6. The insert according to claim 5, further comprising a first test pattern.

7. The insert according to claim 6, wherein said first test pattern is located on an inner face of said thinned part.

8. The insert according to claim 6, wherein the plate comprises an outer face on which said second indexing means are located, and an inner face on which positioning and/or anchoring studs are located, and wherein the insert further comprises a second test pattern which is located on said outer face of said plate.

9. The insert according to claim 1, wherein said second indexing means comprises a recess configured to receive said portion of the cover.

10. The insert according to claim 9, wherein said recess has a generally trapezoidal cross-sectional shape having a first base and a second base, said first base being larger than the second base, said first base being located at an opening of said recess and said second base being located at a bottom of said recess.

11. The insert according to claim 9, further comprising a plate including an outer face on which said second indexing means are located, and an inner face on which positioning and/or anchoring studs are located, and wherein said second indexing means comprises a peripheral O-shaped edge formed as a protrusion on said outer face and internally defining said recess.

12. A run slide for a vehicle window comprising at least two strands connected together by an overmoulded wedge in which an insert according to claim 1 is integrated.

13. The run slide according to claim 12, wherein said first and second indexing means are free of overmolded material.

14. The run slide according to claim 13, wherein the insert comprises a shelf configured to extend parallel to the rabbet and on which said protruding pin is located, wherein said pin and said shelf are free of overmolded material.

15. The run slide according to claim 12, wherein the insert further comprises a first test pattern, wherein the first test pattern is free of overmolded material.

16. The insert according to claim 1, further comprising a plate configured to extend perpendicularly to a plane of the rabbet and on one face of which said second indexing means are located.

17. The insert according to claim 1, further comprising:
a plate configured to extend perpendicularly to a plane of the rabbet, the plate including outer face on which said second indexing means and a test pattern are located and an inner face on which positioning and/or anchoring studs are located.

* * * * *